United States Patent [19]

Wiener

[11] Patent Number: 4,548,421

[45] Date of Patent: Oct. 22, 1985

[54] RECUMBENT VEHICLE

[75] Inventor: David M. Wiener, Westport, Conn.

[73] Assignee: W² Vehicle Design & Development, Inc., Westport, Conn.

[21] Appl. No.: 516,127

[22] Filed: Jul. 21, 1983

[51] Int. Cl.⁴ .............................................. B62K 5/02
[52] U.S. Cl. ............................ 280/281 LP; 280/267; 474/116
[58] Field of Search ................. 280/281 LP, 267, 259, 280/281 R; 474/101, 116, 118, 119, 120

[56] References Cited

U.S. PATENT DOCUMENTS

| | | | |
|---|---|---|---|
| 636,038 | 10/1899 | Greig | 474/116 |
| 1,439,263 | 12/1922 | Rullo . | |
| 2,482,472 | 9/1949 | Fried | 280/261 |
| 2,649,312 | 8/1953 | Miller | 280/277 |
| 2,969,992 | 1/1961 | Hahn | 280/277 |
| 2,976,056 | 3/1961 | Henry | 280/277 |
| 2,993,709 | 7/1961 | Wick | 280/287 |
| 3,429,584 | 2/1969 | Hendricks | 280/281 LP |
| 3,937,490 | 2/1976 | Nasr | 280/242 WC |
| 3,960,392 | 6/1976 | Read | 280/282 |
| 3,981,516 | 9/1976 | Haggkvist | 280/263 |
| 4,152,005 | 5/1979 | Vanore | 280/234 |
| 4,180,280 | 12/1979 | Doveri | 280/277 |
| 4,198,072 | 4/1980 | Hopkins | 280/267 |
| 4,248,448 | 2/1981 | Dmitrowsky | 280/261 |
| 4,272,095 | 6/1981 | Ptaszek | 280/220 |
| 4,279,429 | 6/1981 | Hopkins et al. | 280/267 |
| 4,283,070 | 8/1981 | Forrestall et al. | 280/274 |
| 4,296,940 | 10/1981 | Herbert | 280/278 |
| 4,303,256 | 12/1981 | Mortenson | 280/281 LP |
| 4,333,664 | 6/1982 | Turner et al. | 280/261 |
| 4,373,740 | 2/1983 | Hendrix | 280/269 |
| 4,410,198 | 10/1983 | Fernandes et al. | 280/281 LP |
| 4,421,337 | 12/1983 | Pratt | 280/284 X |
| 4,469,343 | 9/1984 | Weatherford | 280/281 LP |

Primary Examiner—Joseph F. Peters, Jr.
Assistant Examiner—Charles R. Watts
Attorney, Agent, or Firm—Barry R. Lipsitz

[57] ABSTRACT

A recumbent vehicle comprising a single, bowed tubular member forming a main frame having a front end and a rear end. A rear wheel fork assembly is mounted toward the rear end of the main frame with a rear wheel rotatably mounted in the rear wheel fork assembly. A crank assembly, including crank pedals, is mounted to the front end of the main frame. The crank assembly is adjustable to alter the distance of the crank pedals from the front end. A pair of front steering wheels is rotatably mounted toward the front end of the main frame, rearwardly of the crank assembly. A body seat, substantially conforming, throughout its length, to the bowed shape of a portion of the main frame generally intermediate the front steering wheels and the rear wheel, is mounted in alignment with said portion of the main frame.

14 Claims, 11 Drawing Figures

RECUMBENT VEHICLE

BACKGROUND OF THE INVENTION

The present invention relates to three-wheel, human powered vehicles, and more particularly to a recumbent vehicle having a main frame formed from a single, bowed tubular member, and an adjustable crank assembly.

A recumbent, human powered vehicle differs from more conventional bicycles in that the recumbent vehicle is constructed so that the cyclist sits behind the pedals in a seat, usually provided with a back rest, in more of a horizontal position than the vertical position normally used in conventional bicycles. Recumbents have been described in the literature as well as various patents. Examples of such vehicles are shown in U.S. Pat. Nos. 3,960,392; 3,981,516; 4,198,072; 4,279,429; 4,283,070; 4,333,664; and 4,373,740.

The advantages of recumbent vehicles over conventional bicycles are well known. The recumbent vehicles are usually safer than the more conventional bicycles because of the feet-forward position of the rider, enabling the rider to brace himself or herself with his or her feet and even stay seated in a head-on collision. The lower center of gravity and feet-forward riding position mean that a high degree of deceleration can be achieved without the rider being pitched forward. Further, the low center of gravity of the rider will significantly reduce front and rear wheel skids which are more often experienced in conventional bicycles.

The unique seating position of the rider in a recumbent vehicle allows for greater power to be applied to the pedals than would ordinarily be possible on a normal bicycle. Further, the horizontal position of the rider provides much improved comfort over conventional bicycles.

Generally, in most recumbent designs, the position of the seat is relatively fixed with respect to the pedal positions, requiring various sized frames for different sized riders. This, of course, affects the bicycle manufacturing costs as well as the inventory requirements of a bicycle supplier and retailer. Further, in past recumbent vehicle designs, the vehicle frames have been very complex, requiring a large number of structural members. The complexity of such frames results in increased manufacturing costs, and in many cases reduced operating efficiency of the vehicle. Further, such past designs are generally awkward, heavy, and not able to be conveniently carried through standard doorways for storage.

In order to overcome the disadvantages of vehicle designs wherein the vehicle seat is relatively fixed with respect to the pedal positions, several designers in the past have proposed structures, in both recumbent vehicles and conventional bicycles, where either the seat or the frame itself is adjustable. U.S. Pat. No. 4,272,095, for example, shows a child's wheeled riding toy having an adjustable front crank and wheel assembly to accommodate different size children. U.S. Pat. No. 3,960,392 discloses a wheeled vehicle for children which has an open centered frame that is dimensionally adjustable longitudinally to accommodate children of different sizes. U.S. Pat. No. 4,152,005 discloses a tricycle for handicapped inviduals which is adjustable to an optimum position for almost any user. None of these patents, however, pertains to a vehicle having a simple frame structure enabling the rapid adjustment of a chain driven crank assembly, in conjunction with a mechanism for adjusting drive chain slack, in order to accommodate different sized riders.

It would be advantageous to provide a recumbent vehicle which is relatively inexpensive to manufacture, is lightweight, and is adapted to accommodate a large range of different sized riders. It would also be advantageous to provide a recumbent vehicle frame which utilizes a minimum of structural members, yet is strong and efficient. Any such recumbent vehicle frame and recumbent vehicle utilizing such frame should provide a comfortable seating arrangement for a rider, which also optimizes the pedaling, and therefore riding, efficiency.

The present invention relates to such a recumbent vehicle and vehicle frame.

SUMMARY OF THE INVENTION

In accordance with the present invention, a recumbent human powered vehicle is provided which comprises a single, bowed tubular member forming a main frame having a front end and a rear end. A rear wheel fork assembly is mounted toward the rear of the main frame, and a rear wheel is rotatably mounted in the rear wheel fork assembly. A crank assembly, including crank pedals, is mounted to the front end of the main frame. A pair of front steering wheels is rotatably mounted toward the front end of the main frame, rearwardly of the crank assembly. A body seat is provided, which substantially conforms throughout its length to the bowed shape of a portion of the main frame generally intermediate the front steering wheels and the rear wheel. The body seat is mounted in alignment with said portion of the main frame.

The crank assembly can be adjustably mounted to the main frame, in order to alter the distance of the crank pedals from the front end, thereby accommodating different size riders. Such mounting of the crank assembly can be accomplished by telescopically engaging a second tubular member, carrying the crank assembly, with the main frame.

In embodiments wherein the recumbent vehicle is chain driven, means are provided for adjusting the slack in the drive chain when the distances of the crank pedals from the front end of the main frame is adjusted. The slack adjusting means can comprise, for example, a bracket containing a plurality of slots and mounted to the main frame, a first chain pulley, and means for interchangeably mounting the first chain pulley in any of the slots. A second chain pulley is mounted to the main frame, along with means for routing the drive chain in a zigzag arrangement around the first and second chain pulleys.

The main frame of the vehicle can be hollow, and include a plurality of openings along the length thereof to provide access for running cables through the interior thereof. Such cables could, for example, control brakes and derailleurs.

A pair of shock absorbers can be mounted between the rear end of the main frame and the rear fork assembly. Shock protection for the front wheels can be provided through a pair of shock absorbing springs.

DETAILED DESCRIPTION OF A PREFERRED EMBODIMENT

Figure 1:
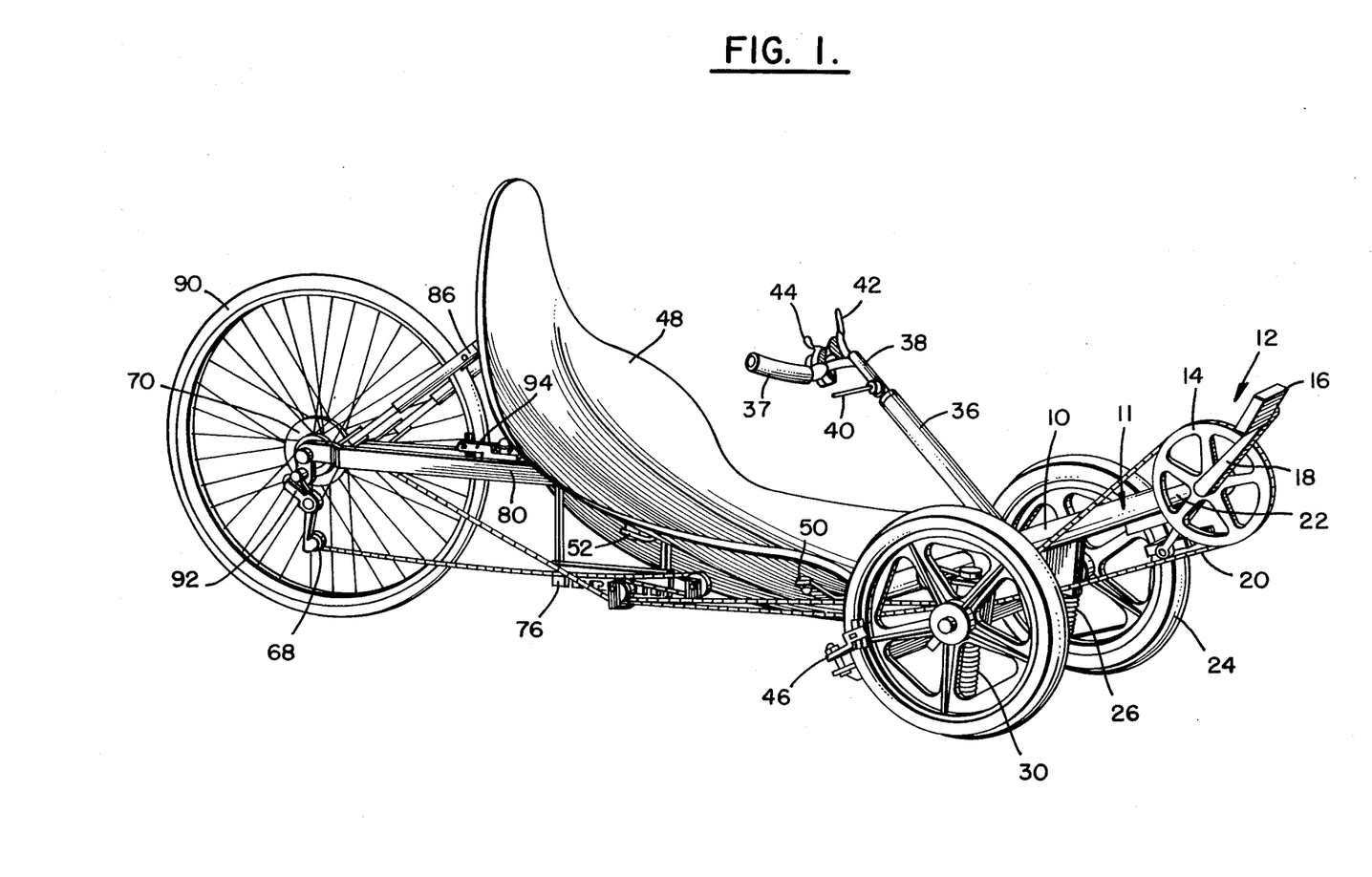
FIG. 1 is a perspective view of a recumbent vehicle in accordance with the present invention.
Figure 2:
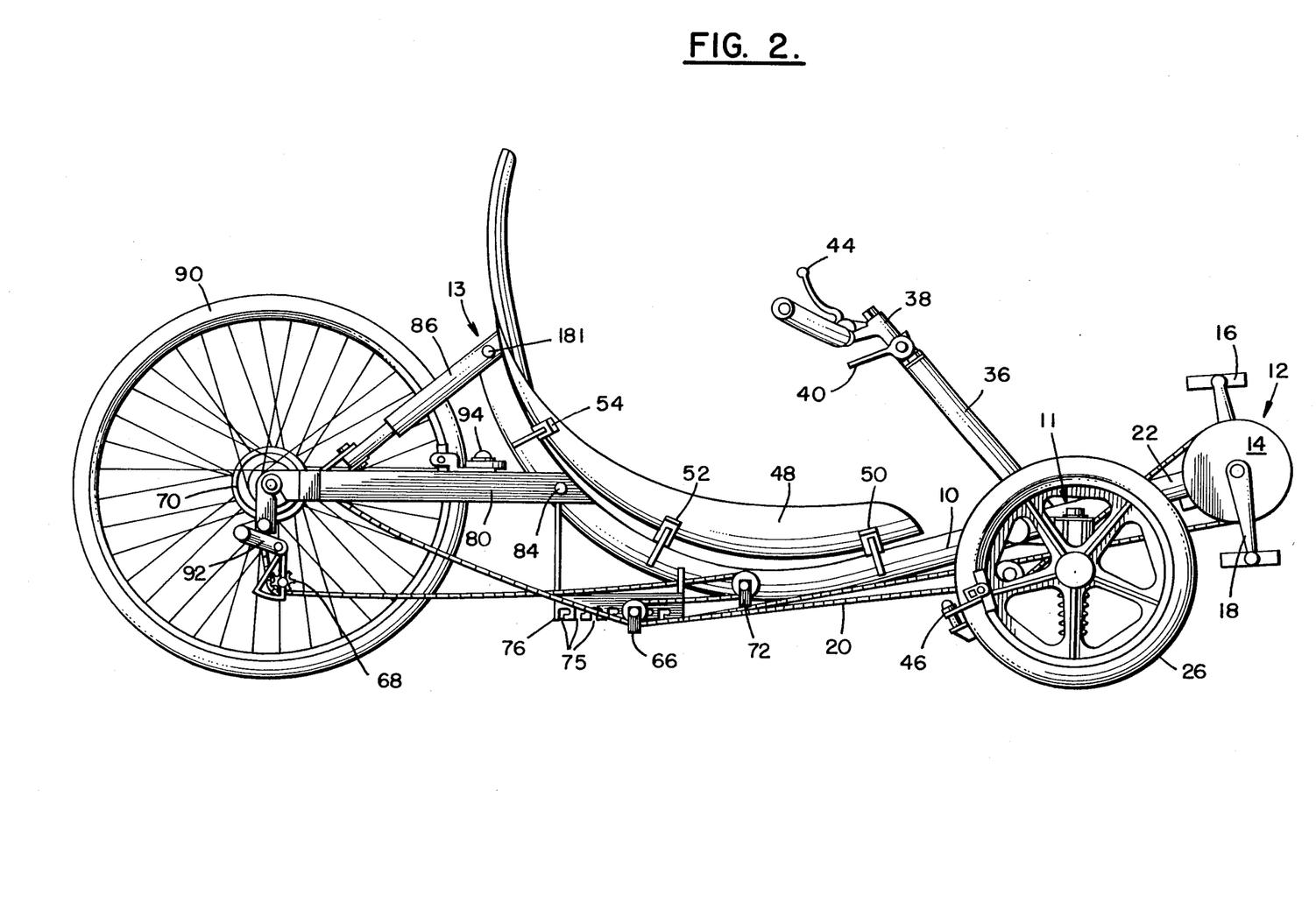
FIG. 2 is a side view of the recumbent vehicle shown in FIG. 1.

A recumbent vehicle in accordance with the present invention is shown in FIGS. 1 and 2. A main frame 10 is formed from a bowed tubular member having a front end 11 and a rear end 13. The tubular member forming main frame 10 can be constructed of heavy gauge steel or, preferably, from a lighter weight, high strength alloy such as chrome alloy steel, manganese molybdenum alloy steel, or the like. An important feature of the present invention is that the main frame 10 is formed from a single, bowed tubular member, most clearly shown in FIG. 6, which supports the vehicle rider, and the other necessary structural elements of the vehicle.

A rear wheel fork assemby 80 is pivotally mounted by pin 84 toward the rear end 13 of main frame 10. Rear wheel fork assembly 80 includes a pair of slots 82 into which a rear wheel 90 is rotatably mounted. A crank assembly 12, including crank pedals 16 and a crank arm 18 is mounted to the front end 11 of main frame 10. In the embodiment shown, crank assembly 12 includes front sprocket wheel 14 which, when rotated about its axis using pedals 16, drives bicycle chain 20. In a preferred embodiment, crank assembly 12 is adjustably mounted to main frame 10 to alter the distance of the crank pedals from front end 11 of main frame 10.

The provision of an adjustable crank assembly enables the recumbent vehicle to accommodate different size riders, without the need to provide different size frames. By extending crank assembly 12 further out from front end 11, a rider with longer legs can be accommodated, while riders with shorter lgs are accommodated by adjusting crank assembly 12 to a position closer to front end 11 of main frame 10.

Figures 3, 4, 5:
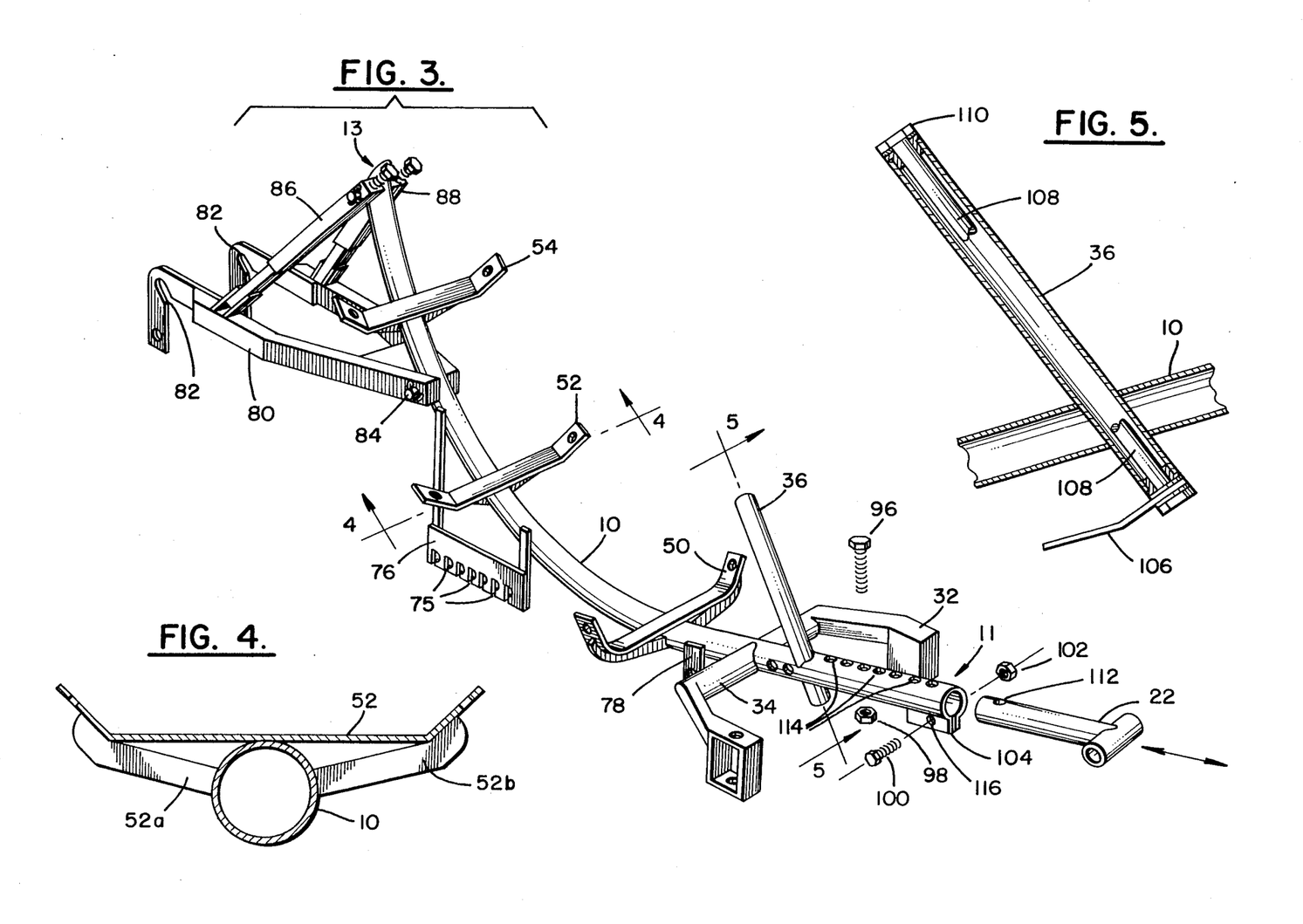
FIG. 3 is a perspective view of the recumbent vehicle frame.
FIG. 4 is a cross-sectional view taken substantially along the line 4—4 shown in FIG. 3.
FIG. 5 is a cross-sectional view taken substantially along the line 5—5 shown in FIG. 3.

One means for adjustment, most clearly shown in FIG. 3, is to telescopically engage a second tubular member 22, carrying crank assembly 12, with main frame 10. As shown in FIG. 3, second tubular member 22 is inserted into front end 11 of main frame 10. A hole 112 in second tubular member 22 is adapted to adjustably align with any of holes 114 provided in main frame 10. When a desired extension of second tubular member 22 from front end 11 is obtained, bolt 96 is inserted through the appropriate hole 114 and hole 112, and is secured on the other side of main frame 10 by nut 98. Alternatively, hole 112 can be threaded to accept bolt 96. A clamp 104, concentric with main frame 10 and second tubular member 22, can be used in combination with holes 112, 114 and nut and bolt 98, 96, or as an alternative thereto. Clamp 104 is, in the embodiment shown, formed from the tubular member forming main frame 10, and includes a hole 116 to accommodate bolt 100. A nut 102 is used to secure bolt 100, which together provide the necessary clamping force. Alternatively, the hole 116 in one side of claim 104 can be threaded, instead of using a separate nut 102.

Figure 6:
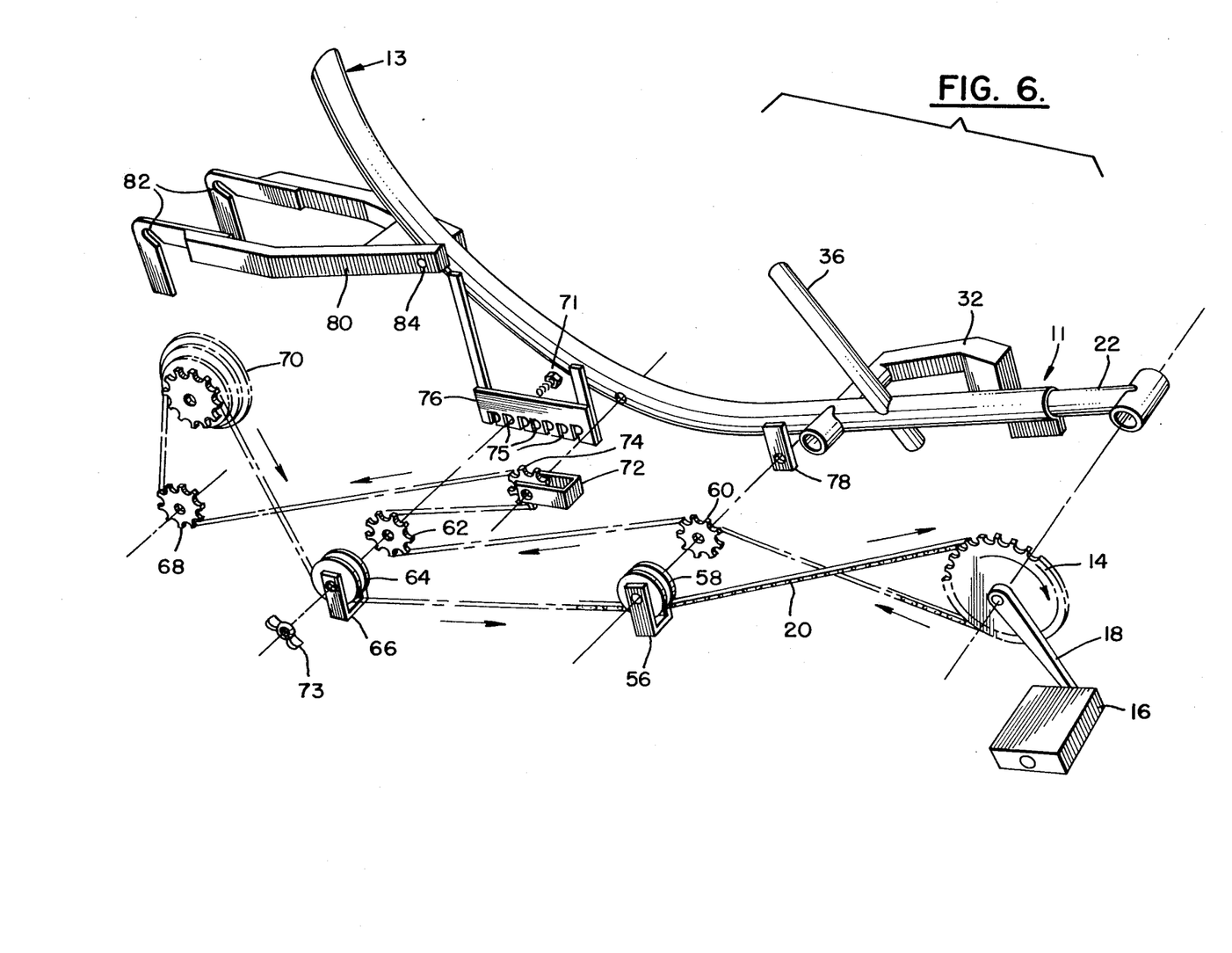
FIG. 6 is an exploded view of the drive chain and vehicle frame assembly.

Another important feature of the present invention is the provision of means for adjusting the slack in drive chain 20 when the distance of crank assembly 12, and thus crank pedals 16, from front end 11 is adjusted. Bracket 76, containing a plurality of slots 75, is mounted to main frame 10 (see FIG. 9) to provide for chain slack adjustment. Turning now to FIGS. 2 and 6, it can be seen that slots 75 in bracket 76 accommodate a first chain pulley 62 which can be interchangably mounted in any of slots 75. Bracket 66 forms a support assembly for first chain pulley 62 and grooved chain guide pulley 64. A second chain pulley 74 is mounted to main frame 10, along with bracket 72. Drive chain 20 is routed in a zigzag arrangement around first chain pulley 62 and second chain pulley 74 as shown.

In order to adjust the chain slack, the vehicle rider first adjusts crank assembly 12 to a setting where the rider's legs are just short of being fully extended when sitting in the vehicle and pressing the crank pedals to their fully extended position. The rider then notes which of holes 114 has been used to secure second tubular member 22 (through the use of bolt 96). Next, the rider mounts first chain pulley 62 in the corresponding slot 75 of bracket 76, using bolt 71 and wing-nut 73. It is noted that the number of slots 75 in bracket 76 equals the number of holes 114 in main frame 10.

Grooved chain guide pulleys 58 and 64 are provided to guide drive chain 20 and reduce drive chain clatter. Pulleys 58 and 64 are preferably made of plastic for long wear and quiet operation. An example of a plastic which is suitable for this purpose is sold by E. I. DuPont & Co. under the registered trademark "Delrin".

Additional chain pulleys may be provided along the path of drive chain 20. For example, chain pulley 60 is mounted along the axis of groove chain guide pulley 58 to main frame 10 through arm 78. Bracket 56 is used to maintain drive chain 20 in a proper orientation with respect to grooved chain guide pulley 58.

After passing over front sprocket 14, drive chain 20 runs over pulley 60, zigzags around first chain pulley 62 and second chain pulley 74, and passes under derailleur pulley 68 to rear drive sprocket 70. From sprocket 70, the chain returns, via grooved chain guide pulleys 64 and 58, to front sprocket 14. Although a single derailleur pulley 68 is shown for clarity, it will be appreciated by those skilled in the art that available derailleur assemblies often have a plurality of such pulleys. Rear sprocket wheel 70 is attached to rear wheel 90, and imparts a driving force to rear wheel 90 when drive chain 20 is driven through the action of crank assembly 12. Those skilled in the art will appreciate that rear sprocket wheel 70 can comprise a freewheel sprocket cluster assembly which contains a plurality of sprocket wheels to provide a plurality of speeds which are selectable through the use of derailleur 92 (see FIG. 2). Derailleur 92 is operated through the use of shift lever 40 which is operatively connected to the derailleur through cable 124 shown in FIGS. 10 and 11. Derailleur 92 is a conventional bicycle component. Although not shown, it would be possible to provide additional gears in the front crank assembly, along with a conventional front derailleur to select different speeds.

The recumbent vehicle of the present invention includes a pair of front steering wheels 24, 26 rotatably mounted toward the front end 11 of main frame 10. Wheels 24, 26 are mounted rearwardly of crank assembly 12, and are steered using handlebar 37 which is attached to handlebar stem 38. Stem 38 extends into steering post tube or "headset" 36. The steering mechanism is shown in greater detail in FIGS. 5 and 7.

As shown in FIG. 5, a headset tube 108 extends through headset 36 and is attached to steering linkage 106 at the bottom end thereof. At the top end of headset 36, a headset nut 110 centers and mounts headset tube 108 in a conventional manner. Stem 38 extends into headset tube 108 and is mounted therein with a conventional wedge assembly (not shown).

Figure 7:
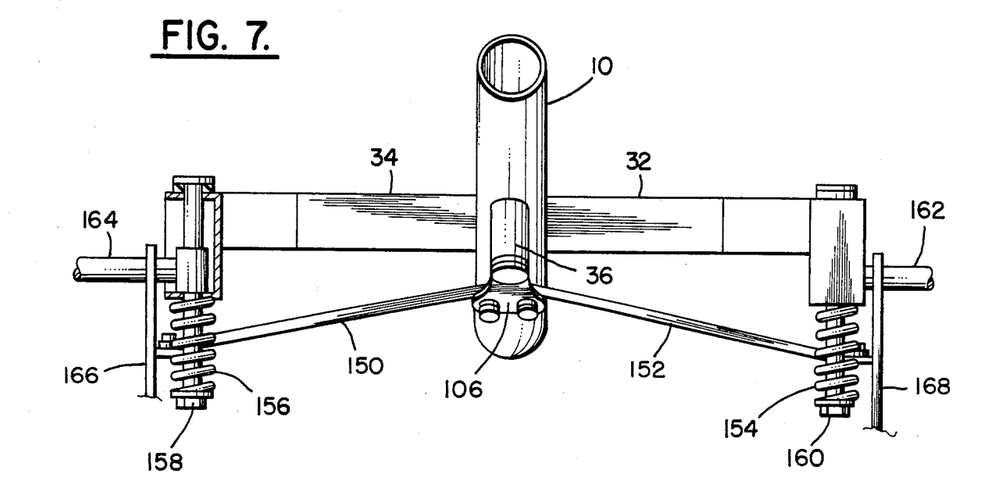
FIG. 7 is a front view of the steering assembly of the recumbent vehicle.

Steering linkage 106 is connected to right tie rod 150 and left tie rod 152. Tie rod 150 is, in turn, coupled to right steering arm 166 which controls axle 164. Left tie rod 152 is coupled to left steering arm 168 which controls left axle 162. Axles 162 and 164 are supported in front wheel struts 32 and 34 respectively. Front wheel struts 32, 34 are mounted to main frame 10, generally perpendicular to main frame 10 and also generally perpendicular to steering post tube or headset 36. Right axle 164 is attached to strut 34 through the use of strut pin 158. A shock absorbing spring 156 is operatively mounted between strut 34 and one end of strut pin 158 to provide shock protection for wheel 26. Similarly, left axle 162 is mounted to strut 32 by strut pin 160, with shock absorbing spring 154 therebetween to provide shock protection for wheel 24.

Figure 8:
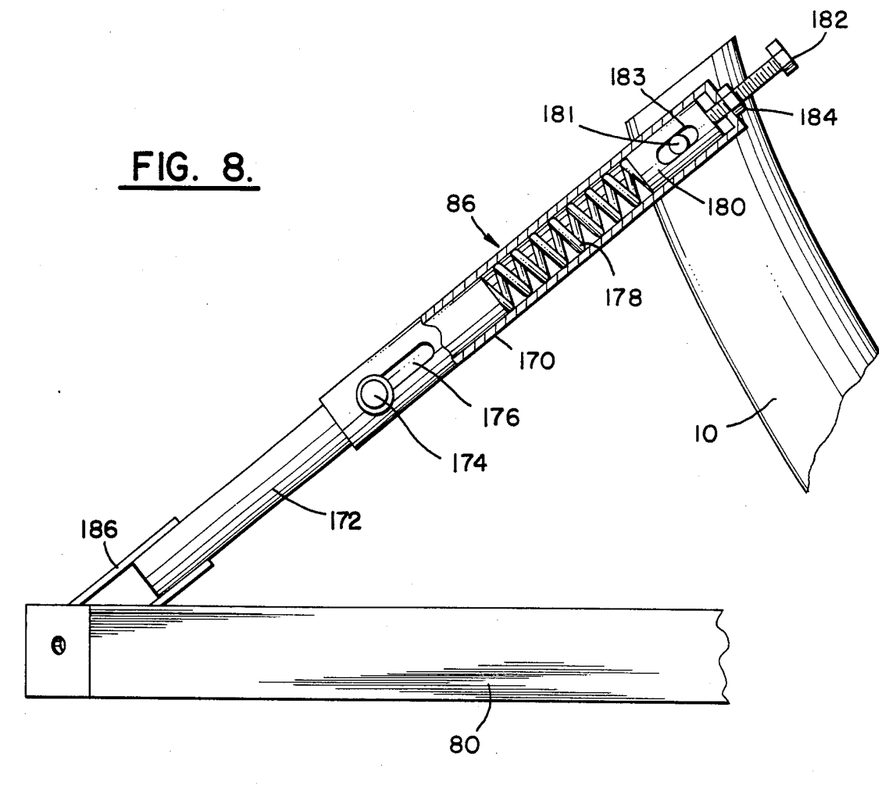
FIG. 8 is a detailed view, in partial cut-away of a rear shock absorber assembly.

Shock protection for rear wheel 90 is provided by a pair of shock absorbers 86 and 88. FIG. 8 is a detailed drawing of shock absorber 86, which is identical to shock absorber 88. An outer tubular member 170 is telescopically engaged with an inner tubular member 172. A spring 178 is mounted between one end of inner tubular member 172 and a block 180. A preload adjustment is provided through the use of bolt 182, which adjustably biases block 180, and lock nut 184. The travel of inner tubular member 172 into outer tubular member 170 is limited by the operation of pin 174 which rides within slot 176. The top end of shock absorber 86 is attached to main frame 10 by the use of a pin 181, which extends through slot 183 and frame 10. Shock absorber 88 is also mounted to the main frame 10 by pin 181. Through this arrangement, both shock absorbers 86 and 88 can pivot about pin 181. The other end of shock absorber 86 is mounted to rear wheel fork 80 through the use of a bracket 186. Shock absorber 88 is mounted in a similar manner.

The vehicle of the present invention also includes, as an important feature thereof, a body seat 48 which substantially conforms throughout its length to the bowed shape of a portion of the main frame. As shown in FIGS. 1 and 2, body seat 48 conforms to the portion of the main frame 10 which is generally intermediate front steering wheels 24, 26 and rear wheels 90. A plurality of seat mounting brackets 50, 52, and 54 are mounted along the length of the tubular member forming main frame 10, intermediate the front wheel struts and the rear end 13 of the tubular member. As shown in FIG. 4, seat mounting bracket 52 includes support arms 52a and 52b which are welded to main frame 10. Seat mounting brackets 50 and 54 are substantially identical to bracket 52 shown in FIG. 4.

Figures 9, 10, 11:
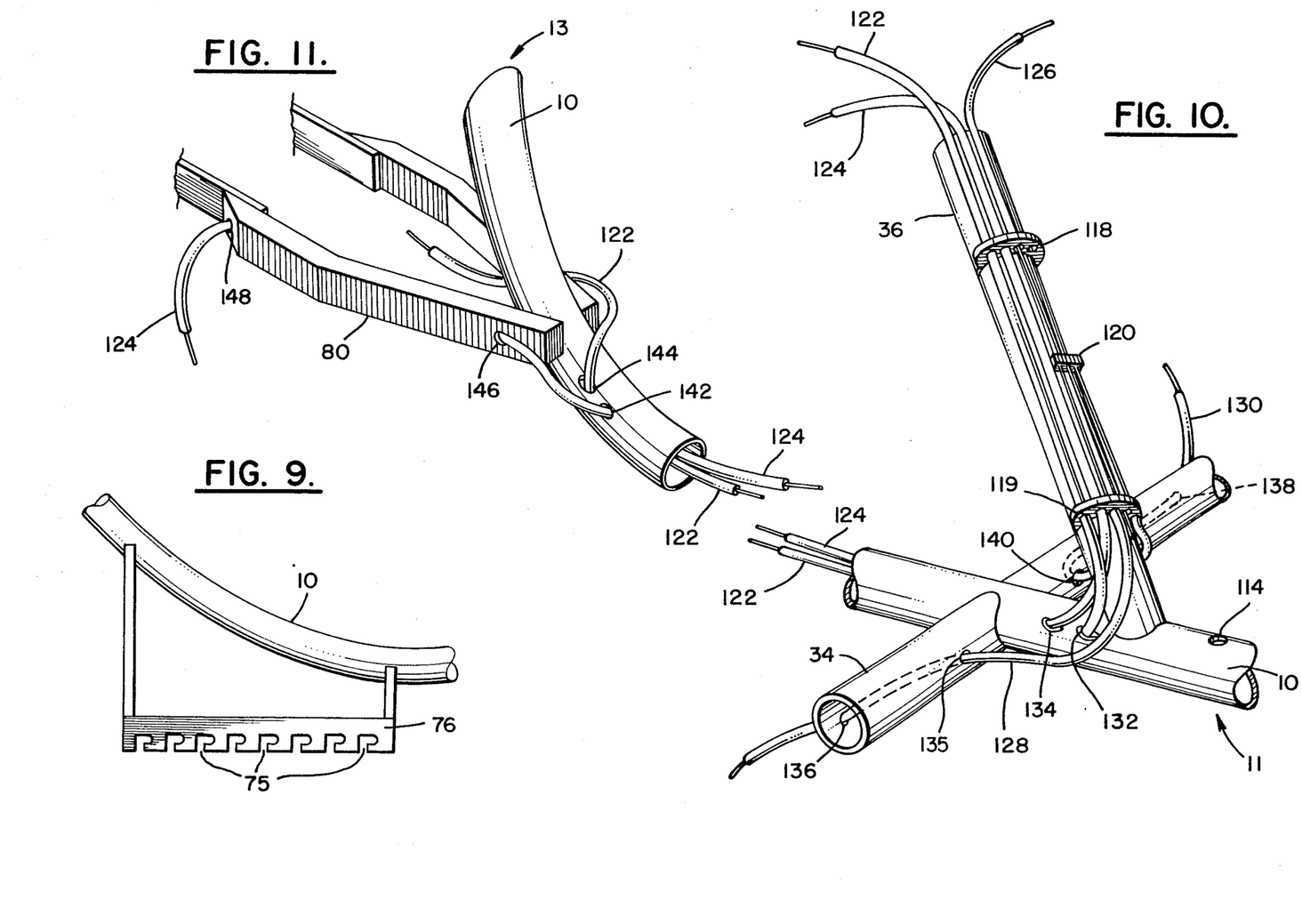
FIG. 9 is a detailed view of a chain slack adjusting bracket mounted to the vehicle frame.
FIGS. 10 and 11 are perspective views showing the brake and derailleur cable routing.

The structure of main frame 10 provides for the routing of derailleur and brake cables therethrough, as shown in FIGS. 10 and 11. Front brakes 46, which are operatively mounted on the steering arms for both front wheels 24 and 26, and rear wheel brake assembly 94 are provided on the vehicle (see FIGS. 1 and 2). The front brakes are controlled by brake lever 42 on handle bar 37 and the rear brakes are controlled by brake lever 44. Cable 122 for rear brake assembly 94 is routed down headset 36, into opening 132 in main frames 10, through the hollow tubular member forming frame 10, and out from opening 144 in main frame 10. Cable 126, which controls the front brakes, is coupled to an equalizer block 120. Cables 128 and 130 are coupled to equalizer block 120 and control the brake assemblies 46 to right wheel 26 and left wheel 24 respectively. Cable 128 is routed through openings 135 and 136 in front wheel strut 34. Cable 130 is routed through openings 140 and 138 in front wheel strut 32. Cable 124, attached to shift lever 40, controls rear derailleur 92. Cable 124 is routed through main frame 10 via openings 134 and 142, and through rear wheel fork 80 via openings 146 and 148. Cable guides 118 and 119 on headset 36 retain the cables in an orderly fashion. It will now be appreciated that the present invention relates to an improved recumbent human powered vehicle which comprises a single, bowed tubular member forming a main frame. An adjustable crank assembly is provided to accommodate different size riders. An adjustable chain slack assembly is also provided. The vehicle comprises a body seat, substantially conforming, throughout its length, to the bowed shape of a portion of the main frame generally intermediate the front steering wheels and the rear wheel. The body seat is mounted in alignment with said portion of the main frame.

The structure of the vehicle disclosed and claimed herein is biomechanically optimized for both comfort and efficiency. The use of the single, bowed tubular member to form the main frame provides a vehicle which is easier to build then prior art vehicles, and which is structurally sound. The structure also provides a vehicle wherein "one size fits all", and wherein brake and derailleur cables are routed internally through the main frame. The drive chain layout contributes to the vehicle's compact arrangement, since the chain generally follows the curve of the main frame. Further, the dimensions of the vehicle can easily be designed to enable the vehicle to fit through a standard size doorway, so that the vehicle can be easily stored. In order to improve its aerodynamic properties, the vehicle can be enclosed in a suitable fairing (not shown).

I claim:

1. A recumbent human powered vehicle comprising:
    a single, bowed tubular member forming a main frame having a front end and a rear end;
    a rear wheel fork assembly mounted toward the rear end of said main frame;
    a rear wheel rotatably mounted in said rear wheel fork assembly;
    a rear sprocket wheel attached to said rear wheel;
    a crank assembly including crank pedals and a front sprocket wheel;
    adjustable means for mounting said crank assembly to the front end of said main frame and altering the distance of the crank pedals from said front end;
    a drive chain connected between said front and rear sprocket wheels;
    a pair of front steering wheels rotatably mounted toward the front end of said main frame, rearwardly of said crank assembly;

a body seat substantially conforming throughout its length to the bowed shape of a portion of said main frame generally intermediate said front steering wheels and said rear wheel;

means for mounting said seat in alignment with said portion of said main frame; and means for adjusting the slack in said drive chain when the distance of the crank pedals from said front end is adjusted, said means for adjusting slack comprising:

a bracket, containing a plurality of slots, mounted to said main frame intermediate said front and rear wheels;

a first chain pulley;

means for interchangably mounting said first chain pulley in any of said slots;

a second chain pulley mounted to said main frame; and means for routing said drive chain in a zigzag arrangement around said first and second chain pulleys.

2. The vehicle of claim 1 wherein said means for mounting said crank assembly comprises a second tubular member carrying said crank assembly and telescopically engaged with said main frame, and means for adjustably securing said second tubular member to said main frame.

3. The vehicle of claim 2 wherein said securing means comprises a plurality of apertures in said main frame and second tubular member which successively form a different pair of aligned apertures as said second tubular member is extended from said main frame, and a bolt of pin adapted to extend through any given pair of aligned apertures to lock said second tubular member at a desired extension.

4. The vehicle of claim 3 wherein said securing means further comprises a clamp concentric with said main frame and said second tubular member.

5. The vehicle of claim 2 wherein said securing means comprises a clamp concentric with said main frame and said second tubular member.

6. The vehicle of claim 1 further comprising at least one plastic, groove chain guide pulley rotatably mounted along the path of said drive chain to reduce drive chain clatter.

7. The vehicle of claim 1 wherein said main frame is hollow, and includes a plurality of openings along the length thereof to provide access for running cables through the interior thereof.

8. The vehicle of claim 1 further comprising a pair of shock absorbers mounted between the rear end of said main frame and said rear wheel fork assembly.

9. The vehicle of claim 8 further comprising a pair of shock absorbing springs operatively mounted to provide shock protection for said front wheels.

10. A recumbent vehicle frame comprising:

a single, bowed tubular member having a front end and a rear end;

a rear wheel fork assembly mounted along the length of said tubular member toward the rear end thereof;

a pair of front wheel struts, for accommodating a pair of front wheels, mounted along the length of said tubular member toward the front end thereof;

a steering post tube mounted along the length of said tubular member toward the front end thereof;

a crank assembly support tube telescopically engaged with the front end of said tubular member;

means for adjusting the slack in a drive chain extending between said crank assembly support tube and said rear wheel fork assembly when the extension of said crank assembly support tube from said front end is adjusted, said means for adjusting slack comprising:

a bracket, containing a plurality of slots, mounted to said tubular member intermediate said front wheel struts and said rear wheel fork assembly;

a first chain pulley;

means for interchangeably mounting said first chain pulley in any of said slots;

a second chain pulley mounted to said tubular member; and means for routing said drive chain in a zigzag arrangement around said first and second chain pulleys.

11. The vehicle frame of claim 10 wherein said front wheel struts are generally perpendicular to said tubular member, and said steering post tube is generally perpendicular to both said tubular member and said front wheel struts.

12. The vehicle frame of claim 10 further comprising a plurality of seat mounting brackets mounted along the length of said tubular member, intermediate said front wheel struts and the rear end of said tubular member, for mounting a body seat in conforming relation to said tubular member.

13. The vehicle frame of claim 12 further comprising a pair of shock absorbers mounted between the rear end of said tubular member and said rear wheel fork assembly.

14. The vehicle frame of claim 10 wherein said tubular member is hollow and further comprising a plurality of openings along the length of said tubular member to provide access for running cables through the hollow interior thereof.

* * * * *